(12) United States Patent
Brown

(10) Patent No.: US 6,647,049 B1
(45) Date of Patent: Nov. 11, 2003

(54) IODINE ON-DEMAND SYSTEM FOR A CHEMICAL LASER

(75) Inventor: Lloyd Chauncey Brown, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/330,726

(22) Filed: Dec. 27, 2002

(51) Int. Cl.[7] .................................................. H01S 3/06
(52) U.S. Cl. .............................. 372/66; 372/89; 372/59
(58) Field of Search ............................... 372/66, 89, 59

(56) References Cited

U.S. PATENT DOCUMENTS

| | | | |
|---|---|---|---|
| 4,434,492 A | | 2/1984 | Benard |
| 4,961,200 A | | 10/1990 | Verdier |
| 5,289,490 A | * | 2/1994 | Taniu et al. .................. 372/92 |
| 5,693,267 A | | 12/1997 | Beshore |
| 5,781,574 A | * | 7/1998 | Connors et al. ............... 372/35 |
| 5,828,686 A | * | 10/1998 | Frey et al. ..................... 372/57 |

* cited by examiner

Primary Examiner—Leon Scott, Jr.
(74) Attorney, Agent, or Firm—Nydegger & Associates

(57) ABSTRACT

A system for supplying Iodine gas to a laser cavity includes a cartridge for generating Iodine gas and delivery piping for transporting Iodine gas from the cartridge to the laser cavity. The cartridge includes a hollow, cylindrical casing having an open end. The casing contains a solid preheat material, a solid mixture containing Iodine, and a purge material. An ignitor squib is disposed in the casing near the open end to initiate a burn front. The burn front travels through the preheat material to generate hot gas for preheating the delivery piping, preventing Iodine gas condensation in the piping. Next, the burn front travels through the mixture containing Iodine to generate Iodine gas which flows through the preheated delivery piping to the laser cavity. The burn front then passes through the purge material generating a purge gas to remove any traces of corrosive Iodine gas from the delivery piping.

20 Claims, 1 Drawing Sheet

IODINE ON-DEMAND SYSTEM FOR A CHEMICAL LASER

FIELD OF THE INVENTION

The present invention pertains generally to chemical lasers that use Iodine gas as an input stream. More particularly, the present invention pertains to systems for producing Iodine gas and delivering the Iodine gas to a laser cavity. The present invention is particularly, but not exclusively, useful as an on-demand Iodine gas supply system that does not require a liquid Iodine reservoir to be maintained during periods of non-demand.

BACKGROUND OF THE INVENTION

The Chemical-Oxygen-Iodine-Laser (COIL) is potentially useful for both military and commercial applications because it is capable of producing a high power laser beam. In the COIL process, Iodine gas is combined with singlet delta Oxygen in a laser cavity to produce a laser beam. Iodine, however, is a solid at room temperature. It must therefore be vaporized to produce the Iodine gas required in the COIL laser cavity.

One method for producing Iodine gas involves melting Iodine in an Iodine reservoir. The Iodine vapors that are given off by the molten Iodine are then transported using a carrier gas to the laser cavity through a delivery system. In general, the required delivery system involves piping and other complex parts such as valves, precision orifices, and temperature and pressure instruments. Unfortunately, this method of producing gaseous Iodine has several drawbacks. For instance, the entire delivery system, including the carrier gas, must be preheated and maintained at elevated temperatures to prevent Iodine condensation from plugging the delivery system. For a typical COIL system that is designed for military applications, several hours are required to melt the Iodine and preheat the delivery system. On the other hand, the source for generating the singlet delta Oxygen that is to be combined with the Iodine gas requires only a fraction of a minute to reach operational status.

In the molten and gaseous states, Iodine is extremely corrosive. Because of Iodine's corrosivity, equipment exposed to Iodine, such as the Iodine reservoir and delivery system described above, must be fabricated from expensive materials such as Hastelloy C-276. In addition to degrading any exposed equipment, the corrosion reaction will, with time at temperature, contaminate the Iodine in the reservoir, requiring the Iodine in the reservoir to be periodically purified or discarded. Impurities in the Iodine must be maintained at very low levels as they may be transported to the laser cavity where they can coat the optical components. For military applications, where readiness is important, a reservoir of molten Iodine would be required at all times, leading to a significant amount of corrosion. Furthermore, the delivery system valves, which must be operated hot and in the presence of Iodine will deteriorate with time at temperature and leak allowing corrosive Iodine to escape. Such a leak could be potentially harmful to electronic equipment. For these reasons, in order to perform routine maintenance on the molten Iodine reservoir and delivery system, these systems must be periodically shut down and allowed to cool. Additionally, maintenance of liquid Iodine systems creates a large amount of Iodine contaminated waste that requires special handling and disposal. In summary, the molten Iodine reservoir and delivery system is large, heavy, costly and complex.

In light of the above, it is an object of the present invention to provide an on-demand Iodine gas supply system for a chemical laser that does not require a liquid Iodine reservoir to be maintained during periods of non-demand. It is another object of the present invention to provide an on-demand Iodine gas supply system for a chemical laser that does not require an Iodine delivery system to be maintained at an elevated temperature during periods of non-demand. It is still another object of the present invention to provide an on-demand Iodine gas supply system for a chemical laser that does not require a delivery system that contains complex parts such as valves and precision orifices. It is yet another object of the present invention to provide an on-demand Iodine gas supply system that allows system maintenance operations to be performed quickly and without generating a large amount of Iodine contaminated waste. Yet another object of the present invention is to provide an on-demand Iodine gas supply system which is easy to use, relatively simple to implement, and comparatively cost effective.

SUMMARY OF THE INVENTION

The present invention is directed to a system for supplying Iodine gas to a laser cavity. For the present invention, the system includes a cartridge for generating Iodine gas, and delivery piping for transporting Iodine from the cartridge to the laser cavity. The cartridge includes a substantially non-combustible casing that can be formed as a hollow cylinder that is open at one end and closed at the other. In accordance with the present invention, the delivery piping is attached to the open end, placing the delivery piping in fluid communication with the inside of the casing. A solid purge material is disposed in the casing and extends from the closed end of the casing to a first interface. For the present invention, the purge material preferably consists of an Iodine-free, solid material that produces a relatively inert gas when ignited.

The cartridge also includes a solid mixture of fuel and oxidizer. Importantly, the mixture contains Iodine. For the present invention, the mixture containing Iodine is disposed in the casing to extend from the first interface to a second interface. With this combination of structure, the mixture containing Iodine is in direct contact with the purge material at the first interface. A preferred mixture for the present invention includes a stoichiometric amount of $C_2I_4$ fuel and Iodine Pentoxide ($I_2O_5$) oxidizer. Optionally, the mixture can include solid Iodine. Preferably, the mixture is compounded to produce a gas having molecular Iodine as its major constituent when ignited.

In addition to the solid mixture containing Iodine and the solid purge material, the cartridge also preferably includes an Iodine-free, solid preheat material. The preheat material is disposed in the casing and extends from the second interface to a third interface. As such, the preheat material and the mixture containing Iodine are in direct contact with each other at the second interface. For the present invention, the preheat material can be any suitable material that produces an elevated temperature gas when ignited.

The cartridge also includes an ignitor squib that is disposed in the casing near the open end of the casing, and is in direct contact with the preheat material. With this combination of structure, the ignitor squib can be activated to initiate a burn front that travels sequentially through the preheat material, the mixture containing Iodine and the purge material. As the burn front passes through the preheat material, gases at elevated temperatures are generated that exit the cartridge through the open end of the casing and flow through the delivery piping. These hot gases heat the delivery piping to a temperature sufficient to prevent Iodine gas condensation in the piping.

Next, with the preheat material vaporized and removed from the casing, the burn front passes through the mixture containing Iodine, igniting the mixture and generating Iodine gas. The Iodine gas then exits the casing through the open end and flows through the preheated delivery piping to the laser cavity. It is to be appreciated that the flow rate of Iodine gas and the period of Iodine gas generation can be selectively altered by varying the dimensions of the solid mixture and the casing. Specifically, the length is proportional to the delivery time and the cross sectional area is proportional to the Iodine flow rate. In the laser cavity, the Iodine gas can be used to create a laser beam. For example, in the well known chemical-Oxygen-Iodine-laser (COIL) process, Iodine gas is combined with singlet delta Oxygen in the laser cavity to produce a laser beam. The present invention can also be used as an Iodine on-demand system for an All Gas Iodine Laser (AGIL).

Once the burn front has traversed the mixture containing Iodine and the entire mixture is vaporized and removed from the casing, the burn front passes through the purge material, igniting the purge material and generating a purge gas. The purge gas then exits the casing through the open end and flows through the delivery piping to remove any traces of corrosive Iodine from the delivery piping.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
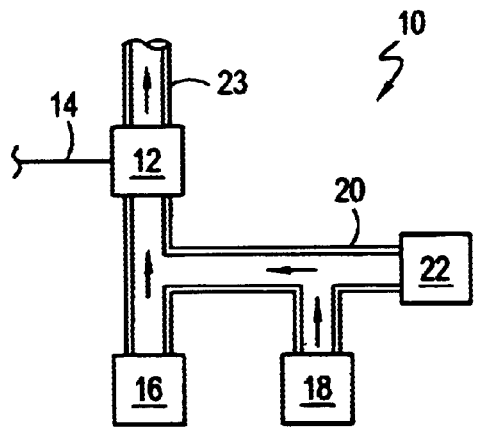
FIG. 1 is a schematic of a chemical-Oxygen-Iodine-laser (COIL) system in accordance with the present invention.

Referring initially to FIG. 1, a chemical-Oxygen-Iodine-laser (COIL) system in accordance with the present invention is shown and generally designated 10. As shown in FIG. 1, the system 10 includes a laser cavity 12 for producing a laser beam 14. As further shown, a singlet delta Oxygen supply 16 is provided to introduce singlet delta Oxygen into the laser cavity 12. System 10 further includes an on-demand Iodine supply 18 for generating Iodine gas for use in the laser cavity 12. As shown, delivery piping 20 is provided to transport Iodine gas from the Iodine supply 18 to the laser cavity 12. An optional carrier gas supply 22, such as a Nitrogen gas generator, can be provided to promote Iodine flow through the delivery piping 20. An exhaust line 23 is provided to route exhaust gases from the laser cavity 12. If desired, these exhaust gases can be routed via line 23 to an Iodine recycle system or scrubber (not shown).

Figure 2:
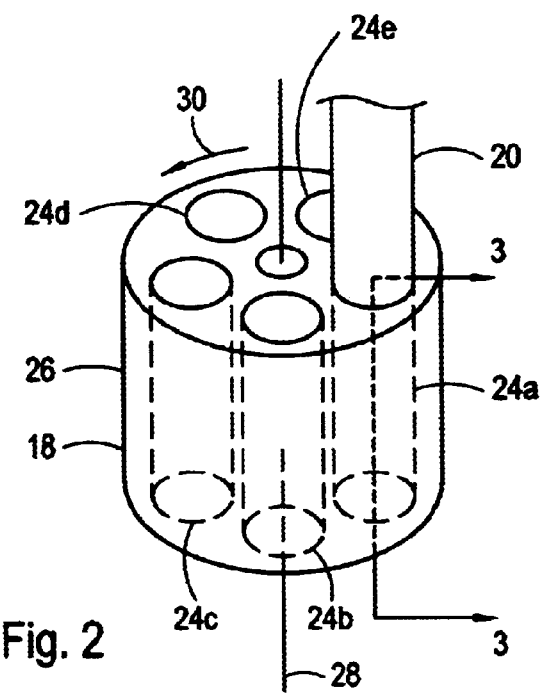
FIG. 2 is a perspective view of an Iodine gas on-demand supply system showing a plurality of Iodine supply cartridges disposed in a revolver housing to allow for rapid Iodine supply cartridge replacement.

Referring now to FIG. 2, a preferred embodiment of an on-demand Iodine supply 18 in accordance with the present invention is shown. As shown, the Iodine supply 18 includes a plurality of Iodine supply cartridges 24a–e disposed in a cylindrical revolver housing 26. In accordance with the present invention, the revolver housing 26 can be rotated about axis 28 in the direction of arrow 30 to successively align each cartridge 24a–e with the delivery piping 20 to rapidly replace each cartridge 24a–e after its use. It is contemplated that as little as a few seconds will lapse between successive firing of cartridges 24a–e. In an alternate embodiment, the cartridges 24a–e can be placed in a magazine (not shown) to allow successive firing of the cartridges 24a–e.

Figure 3:
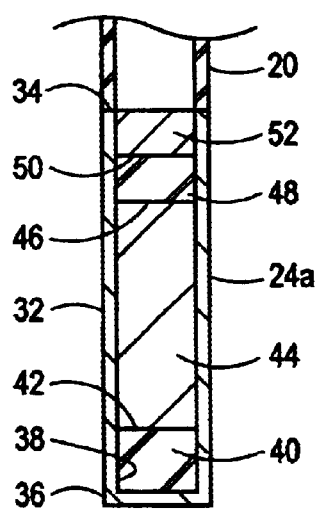
FIG. 3 is a sectional view of an Iodine supply cartridge and a portion of a delivery pipe as seen along line 3—3 in FIG. 2.

With reference now to FIG. 3, it can be seen that the cartridge 24a includes a substantially non-combustible casing 32 that is formed as a hollow cylinder. The casing 32 is formed with an open end 34 and a closed end 36 and preferably has a cylindrically shaped inner surface 38. As shown, delivery piping 20 is positioned adjacent to the casing 32 at the open end 34. In the preferred embodiment of the present invention, a solid, Iodine-free purge material 40 is disposed in the casing 32, substantially filling the casing 32 from the closed end 36 of the casing 32 to a first interface 42. As such, the purge material 40 can substantially conform to the shape of the inner surface 38 of the casing 32. For the present invention, the purge material 40 consists of an Iodine-free, solid material that produces a relatively inert gas when ignited. In a preferred embodiment of the present invention, a mixture of Ammonium Nitrate and Oxalic Acid is used as the purge material 40 to produce a mixture of Nitrogen, water, Carbon Dioxide and Carbon Monoxide gases. Alternatively, a mixture of Sodium Azide, Potassium Nitrate and Silica will produce only Nitrogen but with solid by-products.

The cartridge 24a also includes a solid mixture of fuel and oxidizer (mixture 44) that preferably can be ignited to produce a gas with little or no solid residue. Importantly, the mixture 44 contains Iodine. In the mixture 44, the Iodine can be present in the fuel (such as $C_2I_4$), the oxidizer (such as Iodine Pentoxide ($I_2O_5$)) or solid Iodine can be compounded with a fuel and oxidizer to create a mixture 44 containing Iodine. Table 1 below shows preferred fuel and oxidizer systems for used in the mixture 44.

TABLE 1

| Fuel | Oxidizer | Fabrication Techniques |
| --- | --- | --- |
| Polystyrene | $I_2O_5$ | Castable system |
| Polybutadiene | $I_2O_5$ | Castable system |
| $CI_4$ | $I_2O_5$ | Pelletized system |
| $C_6I_6$ | $I_2O_5$ | Pelletized system |
| $CHI_3$ | $I_2O_5$ | Pelletized system |
| $CIN$ | $I_2O_5$ | Pelletized system |
| $CHI_3$ | $NH_4IO_3$ | Pelletized system |
| $CI_4$ | $NH_4IO_3$ | Pelletized system |
| $CI_4$ | $NH_4NO_3$ | Pelletized system |
| $C_2I_4$ | $I_2O_5$ | Pelletized system |
| Sn | $I_2O_5$ | Pelletized system |

A first preferred mixture 44 for the present invention includes a stoichiometric amount of $C_2I_4$ fuel and Iodine Pentoxide ($I_2O_5$) oxidizer. The stoichiometric products upon reaction of this mixture 44 are Iodine and Carbon Dioxide. It is to be appreciated that non-stoichiometric fuel/oxidizer ratios can be used in the mixture 44. In general, increasing the ratio of $I_2O_5$ to fuel (i.e. a lean burn) can be used to increase the amount of molecular Iodine gas generated (and decrease the amount of atomic Iodine). Molecular Iodine gas is generally preferred in current COIL devices but there are theoretical reasons that atomic Iodine may be preferable. In a rich burn, Carbon Monoxide is produced along with the Iodine and Carbon Dioxide, and in a lean burn Oxygen is the additional product. Operating lean or adding solid Iodine to the mixture 44 can be used to increase the Iodine concentration in the product gas. Preferably, the mixture 44 is formulated and compounded to produce a gas having molecular Iodine as its major constituent. The mixture 44 is further formulated so that other constituents in the gas, such as Carbon Dioxide and water, are not present in concentrations that will interfere with the COIL process. Due to the exothermic nature of the combustion of the mixture 44, continued heating of the delivery piping 20 (after preheat) is not required to prevent Iodine condensation. For example, a stoichiometric mixture of $Cl_4$ and $I_2O_5$ has a calculated combustion gas temperature of approximately 1700° C. It is to be further appreciated that the temperature of the Iodine entering the laser cavity 12 (shown in FIG. 1) can be altered by varying the composition of the mixture 44 or by varying the composition or temperature of the carrier gas 22 (shown in FIG. 1). In general, for the COIL process, it is desirable to deliver Iodine to the laser cavity 12 at a temperature of approximately 160° C., diluted with Nitrogen or Helium.

Referring still to FIG. 3, it can be seen that the mixture 44 containing Iodine is disposed in the casing 32, substantially filling the casing 32 from the first interface 42 to a second interface 46. As such, the mixture 44 can substantially conform to the shape of the inner surface 38 of the casing 32 and is in direct contact with the purge material 40 at the first interface 42. Casting or pelletizing methods can be used to prepare the solid, conforming mixture 44. In the casting method, a slurry or paste of an inorganic solid oxidizer containing Iodine with a monometer (fuel) is prepared. A catalyst is added and the mixture 44 is poured into the casing 32 where the monometer polymerizes, binding the constituents into a solid mass that conforms to the inner surface 38 of the casing 32. In the pelletizing method, the oxidizer and fuel are blended and pressed together forming pellets. The pellets are then inserted into the casing 32, producing a solid mass that is disposed in the casing 32.

With continued reference to FIG. 3, it is shown that the cartridge 24a also preferably includes an Iodine-free, solid preheat material 48. As shown, the preheat material 48 is disposed in the casing 32 filling the casing 32 from the second interface 46 to a third interface 50. As such, the preheat material 48 can substantially conform to the shape of the inner surface 38 of the casing 32. Furthermore, the preheat material 48 and the mixture 44 containing Iodine are in direct contact with each other at the second interface 46. For the present invention, the preheat material 48 can be any suitable material that can be ignited to produce an elevated temperature gas. The gas, in turn, is used to preheat the delivery piping 20 to prevent Iodine condensation in the delivery piping 20 during combustion of the mixture 44. Preferably, the elevated temperature gas preheats the delivery piping 20 above the melting point of Iodine (114° C.) to prevent plugging of the delivery piping 20.

It is further shown in FIG. 3 that the cartridge 24a preferably includes an ignitor squib 52 that is disposed in the casing 32 near the open end 34 of the casing 32 and is in direct contact with the preheat material 48. With this combination of structure, the ignitor squib 52 can be activated to initiate a burn front that travels sequentially through the preheat material 48, the Iodine containing mixture 44 and the purge material 40. More specifically, the cartridge 24a is configured to uniformly pass a controlled burn front from the open end 34 of the casing 32 to the closed end 36 of the casing 32.

The operation of the COIL system 10 can best be appreciated with combined reference to FIGS. 1, 2 and 3. Initially, an unused cartridge 24a–e is aligned with the delivery piping 20. Next, when a laser beam 14 is required, the ignitor squib 52 can be activated to initiate a burn front that travels sequentially through the preheat material 48, the Iodine containing mixture 44 and the purge material 40. As the burn front passes through the preheat material 48, gases at elevated temperatures are generated that exit the cartridge 24a through the open end 34 of the casing 32 and flow through the delivery piping 20. These hot gases heat the delivery piping 20 to a temperature sufficient to prevent Iodine gas condensation in the delivery piping 20.

Once the preheat material 48 is vaporized and removed from the casing 32, the burn front passes through the Iodine containing mixture 44, igniting the mixture 44 and generating Iodine gas. The Iodine gas then exits the casing 32 through the open end 34 and flows through the preheated delivery piping 20 to the laser cavity 12. During Iodine gas generation, the carrier gas supply 22 can be activated to assist the flow of Iodine to the laser cavity 12 or alter the temperature or composition of the Iodine flow. The singlet delta Oxygen supply 16 can be activated using techniques well known in the art to deliver singlet delta Oxygen to the laser cavity 12 to react with the Iodine to produce a laser beam 14. It is to be appreciated that the flow rate of Iodine gas and the period of Iodine gas generation can be selectively altered by varying the dimensions of the solid mixture 44 and the casing 32. Furthermore, the aspect ratio of the mixture 44 in the cartridge 24a can be selected to ensure a smooth uniform burn that generates a uniform flow rate of Iodine gas for a fixed time.

Once the burn front has traversed the Iodine containing mixture 44 and the entire mixture 44 is vaporized and removed from the casing 32, the burn front passes through the purge material 40, igniting the purge material 40 and generating an Iodine-free, purge gas. The purge gas then exits the casing 32 through the open end 34 and flows through the delivery piping 20 to remove any traces of corrosive Iodine from the delivery piping 20. With the first cartridge 24a depleted, the revolver housing 26 can be rotated to align another cartridge 24b–e with the delivery piping 20 to repeat the above-described process.

While the Iodine On-Demand System for a Chemical Laser as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for supplying Iodine gas, said system comprising:
   a non-combustible casing formed with an open end and a closed end;
   a fuel and oxidizer mixture, said mixture being solid and containing Iodine, said mixture disposed in said casing; and
   means for igniting said mixture to generate Iodine gas for exit from said open end of said casing.

2. A system as recited in claim 1 further comprising:
   a delivery pipe in fluid communication with said open end of said casing;
   a solid preheat material disposed in said casing between said mixture and said open end of said casing; and a means for igniting said preheat material to heat said delivery pipe.

3. A system as recited in claim 1 further comprising:

a delivery pipe in fluid communication with said open end of said casing; and a solid purge material disposed in said casing between said mixture and said closed end of said casing, said purge material for ignition by said mixture to generate a purge gas for exit from said open end of said casing and transit through said delivery pipe to flush gaseous Iodine from said delivery pipe.

4. A system as recited in claim 1 wherein said mixture contains an approximately stoichiometric amount of oxidizer and fuel.

5. A system as recited in claim 1 wherein said mixture comprises solid Iodine.

6. A system as recited in claim 1 wherein said mixture comprises Iodine Pentoxide ($I_2O_5$) and $C_2I_4$.

7. A system as recited in claim 1 wherein said mixture contains a fuel selected from the group consisting of Polystyrene, Polybutadiene, $C_2I_4$, $C_6I_6$, $CHI_3$, CIN, $CI_4$, and Sn.

8. A system as recited in claim 1 wherein said mixture contains an oxidizer selected from the group consisting of $I_2O_5$, $NH_4IO_3$, and $NH_4NO_3$.

9. A system for supplying Iodine gas, said system comprising:

a delivery pipe having an inlet and an outlet;

a solid preheat material;

a fuel and oxidizer mixture, said mixture being solid and containing Iodine; and a means for igniting, in sequence, said preheat material and then said mixture, said ignition of said preheat material to generate gas at an elevated temperature for introduction into said inlet of said delivery pipe to heat said delivery pipe and said ignition of said mixture to generate Iodine gas for introduction into said inlet of said delivery pipe for subsequent delivery at said outlet of said delivery pipe.

10. A system as recited in claim 9 further comprising:

a solid purge material; and a means for igniting said solid purge material after ignition of said mixture to generate a purge gas for introduction into said inlet of said delivery pipe to purge said delivery pipe of said Iodine gas.

11. A system as recited in claim 9 wherein said means for igniting, in sequence, said preheat material and said mixture is a single ignition source for passing a burn front through said preheat material and said mixture.

12. A system as recited in claim 10 wherein said means for igniting, in sequence, said preheat material, and said mixture and said means for igniting said solid purge material after ignition of said mixture, is a single ignition source for passing a burn front through said preheat material, said mixture, and said purge material.

13. A system as recited in claim 9 wherein said preheat material and said mixture are disposed in a single casing.

14. A system as recited in claim 9 wherein said mixture contains Iodine Pentoxide ($I_2O_5$) and $C_2I_4$.

15. A laser system comprising:

a laser cavity;

a casing formed with an open end and a closed end;

a fuel and oxidizer mixture, said mixture being solid and containing Iodine, said mixture being disposed in said casing;

a means for igniting said mixture to generate Iodine gas for exit from said open end of said casing;

a means for transporting said Iodine gas from said open end of said casing to said laser cavity; and a means for exciting said Iodine gas to cause said Iodine gas to lase in said laser cavity.

16. A laser system as recited in claim 15 wherein said means for exciting said Iodine gas comprises a source of singlet delta Oxygen.

17. A laser system as recited in claim 15 wherein said transporting means comprises a delivery pipe and said laser system further comprises a solid preheat material disposed in said casing between said mixture and said open end of said casing and a means for igniting said preheat material to generate gas at an elevated temperature to heat said delivery pipe.

18. A laser system as recited in claim 15 wherein said transporting means comprises a delivery pipe and said laser system further comprises a solid purge material disposed in said casing between said mixture and said closed end of said casing and a means for igniting said purge material to generate purge gas to purge said delivery pipe of said Iodine gas.

19. A laser system as recited in claim 15 wherein said casing is a first casing and further comprising a second casing having a fuel and oxidizer mixture containing Iodine disposed therein; and a means for exchanging said second casing in place of said first casing to allow said mixture in said second casing to be ignited to create additional said Iodine gas for introduction into said laser cavity.

20. A laser system as recited in claim 19 wherein said exchanging means is a revolver.

* * * * *

UNITED STATES PATENT AND TRADEMARK OFFICE
CERTIFICATE OF CORRECTION

PATENT NO. : 6,647,049 B1
DATED : November 11, 2003
INVENTOR(S) : Lloyd Chauncey Brown It is certified that error appears in the above-identified patent and that said Letters Patent is hereby corrected as shown below:

<u>Column 4,</u>
Line 49, delete "Cl$_4$" insert -- CI$_4$ --
Line 52, delete "ClN" insert -- CIN --
Lines 54 and 55, delete "Cl$_4$" insert -- CI$_4$ --

<u>Column 5,</u>
Line 14, delete "Cl$_4$" insert -- CI$_4$ --

Signed and Sealed this

Twenty-fourth Day of February, 2004

JON W. DUDAS
*Acting Director of the United States Patent and Trademark Office*